United States Patent [19]

Kurata et al.

[11] Patent Number: 4,633,314

[45] Date of Patent: Dec. 30, 1986

[54] SHADING CORRECTION DEVICE

[75] Inventors: Masami Kurata; Hiroyuki Saitoh, both of Ebina, Japan

[73] Assignee: Fuji Xerox Co., Ltd., Tokyo, Japan

[21] Appl. No.: 513,732

[22] Filed: Jul. 14, 1983

[30] Foreign Application Priority Data

Jul. 20, 1982 [JP] Japan .................................. 57-126863

[51] Int. Cl.$^4$ .............................................. H04N 5/14
[52] U.S. Cl. .................................... 358/163; 358/213; 358/284; 358/166
[58] Field of Search ............... 358/163, 164, 168, 169, 358/28, 32, 37, 166, 212, 213, 284; 382/53

[56] References Cited

U.S. PATENT DOCUMENTS 4,486,781  12/1984  Wilmer et al. ...................... 358/163
4,523,229   6/1985  Kanmoto ............................. 358/163
4,554,583  11/1985  Saitoh et al. ........................ 358/163

FOREIGN PATENT DOCUMENTS 0079567  6/1980  Japan .................................. 358/163
0104362  6/1982  Japan .................................. 358/163

Primary Examiner—Tommy P. Chin
Assistant Examiner—Michael D. Parker
Attorney, Agent, or Firm—Spensley Horn Jubas & Lubitz

[57] ABSTRACT

A shading correction device has a variable attenuator which is provided in the transmission line of the picture signal after photoelectric conversion by the original reader. For example, at the time of reading all white surface of the original at the beginning of the original scan the information level of each bit of the picture signal, i.e., the level of each picture element, is sequentially attenuated by the variable attenuator. In order to make the level of each picture element uniform, a data on how much attenuation is required, is generated for each picture element and loaded in a memory. The variable attenuator is adapted to be driven and controlled based on the data loaded in the memory at the time of reading the original in the subsequent scan.

17 Claims, 7 Drawing Figures

FIG. 1 PRIOR ART

FIG. 2 PRIOR ART (a) ACTUAL IMAGE INFORMATION ON ORIGINAL MS (b) PHOTOELECTRIC CONVERTED PICTURE SIGNAL CE (c) BINARY SIGNAL BS

SHADING CORRECTION DEVICE

BACKGROUND OF THE INVENTION

This invention relates to a shading correction device performing shading correction of an original reader.

Figure 1:
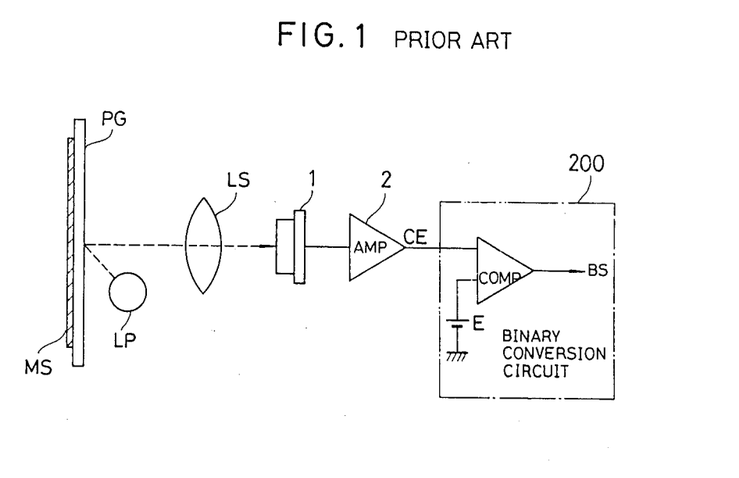
FIG. 1 is a block diagram illustrating a schematic configuration of a conventional original reader.

Generally, a conventional original reader in which a solid-state image pickup device such as a charge coupled device (CCD) is employed as an image sensor is configured as illustrated in FIG. 1 in which an image sensor 1 performs photoelectric conversion of the image information presented on an original MS. The image information irradiates the surface of the image sensor 1 in the form of reflected light as a result of irradiating the original MS through an original supporting glass PG by a light source LP such as a fluorescent lamp to produce a picture signal CE. This picture signal CE is then applied to a binary conversion circuit 200 via an amplifier 2. At the binary conversion circuit 200, a binary converted signal BS is formed based on the comparison of the applied picture signal CE with a binary conversion reference level E.

However, in such conventional original reader the level of the picture signal produced by the photoelectric conversion becomes uneven due to the following reasons, resulting in unfavorable effects on the signal processing at the binary conversion circuit 200.

(a) Light from the light source LP has an uneven luminance distribution and the luminance typically decreases with the positional change from the center to the end of the light source.

(b) Light through the periphery of the lens LS is dark according to the cos fourth power law, and the level of the reflected light falls at around the periphery.

(c) There is a variation in the sensitivity of the solid-state image pickup device to be used as the image sensor 1.

Figure 2:
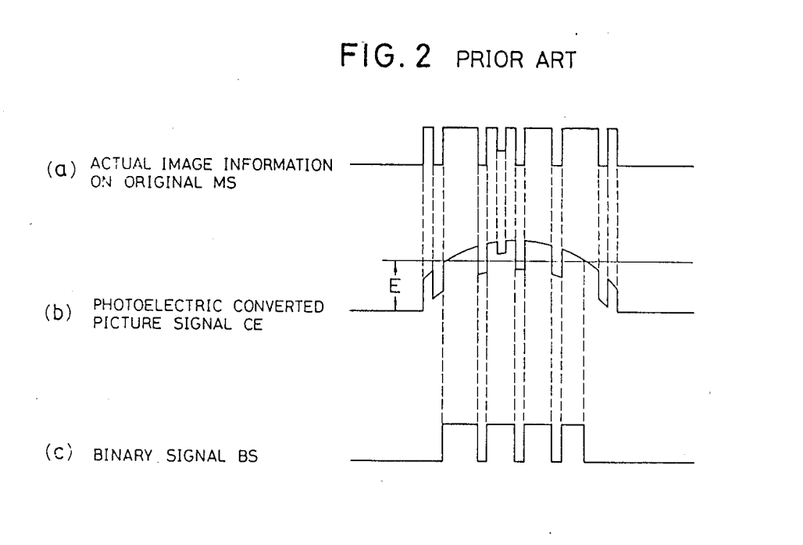
FIG. 2 is a time chart showing the pattern of a picture signal picked up by the conventional original reader.

FIG. 2 shows the descrepancy between the image information on the original and the binary converted signal BS.

That is, though the image information on the original MS shall be picked up in one scan precisely as shown in FIG. 2(a), due to the reason given in (a) through (c) above the picture signal CE after the photoelectric conversion becomes uneven as shown in FIG. 2(b), and when the signal is binary converted based on the comparison with the binary conversion reference level E at the binary conversion circuit 200 the resulted binary converted signal BS becomes far different from the actual image information of the original MS as shown in FIG. 2(c). Thus, the original MS cannot be reproduced with fidelity when the image is reproduced based on such binary converted signal.

SUMMARY OF THE INVENTION

Accordingly, the present invention has been made to overcome the above-noted problem involved in the prior art and is directed to provide a shading correction device to assure a high reproducibility in picture signal processing at the original reader. The shading correction device according to the present invention eliminates the unevenness of the signal level by subjecting the picture signal after the photoelectric conversion to automatic shading correction.

In order to achieve the above object, in the shade correction device of the present invention a variable attenuator is provided in the path of the photoelectrically converted picture signal, data on how much attenuation is required to make the level of each picture element uniform is generated for each picture element while the level of each bit of the picture signal, i.e., the level of each picture signal is lowered at the time of scanning on total white surface of the original in the initial stage of original scan, the data is stored in a memory, and at the time of reading the original in subsequent scan the variable attenuator is driven and controlled based on the data stored in the memory. In this manner, the picture signal is subjected to the shading correction for all picture elements one by one and transferred to the subsequent stage as a highly reliable signal for image reproduction.

DESCRIPTION OF THE PREFERRED EMBODIMENT

The shading correction device of the present invention will now be described in detail with reference to the accompanying drawings in which the presently preferred embodiment of the invention is illustrated by way of example.

Figure 3:
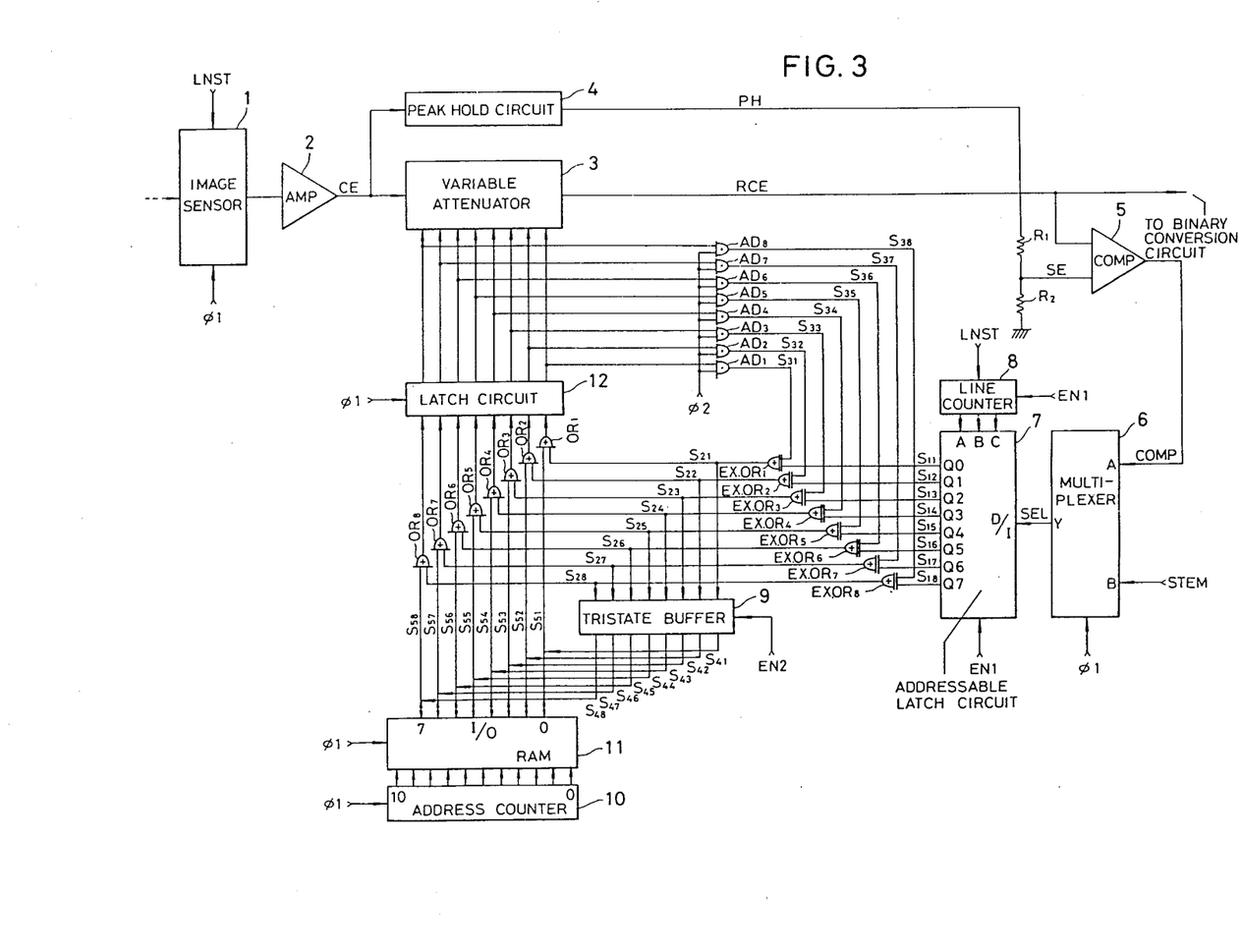
FIG. 3 is a block diagram of an embodiment of the shading correction device of the present invention.

FIG. 3 shows an embodiment of the shading correction device of the present invention in which a picture signal CE consists of 2048 bit and the shading correction device is capable of performing level correction in $2^8 = 256$ steps for each bit of the picture signal CE. In this embodiment device, 50% of the maximum level of the picture signal CE is taken as the shading correction reference level. An image sensor 1 and an amplifier 2 are the same as those shown in FIG. 1 and description about those units are omitted, except that the image sensor 1 performs the photoelectric conversion of the aforementioned reflected light sequentially based on a line start signal LNST and video clock 1 and that the amplifier 2 is assumed to be undergone gain setting so that the minimum level of the signal levels showing the white picture element of the picture signal CE becomes 50% or more level of the maximum level of the picture signal CE.

First, the function of each block comprising this embodiment device will be described briefly.

The variable attenuator 3, for example in the case of this device, consists of eight transistor switching arrays and the ON/OFF mode of these switching arrays are controlled corresponding to the contents of an 8-bit data obtained from a latch circuit 12 so as to provide various attenuations to the image signal to be fed corresponding to the switch mode. Accordingly if the attenuation levels determined by the eight transistor switches are all different, up to $2^8=256$ different attenuation levels can be produced, and the level correction up to 256 steps can be performed for the above picture signal CE. As will be described later, the content of the 8-bit data to be output from the latch circuit 12 is updated synchronized with the video clock $\phi1$, and the 256-step level correction is executed bit by bit of the picture signal CE.

A peak hold circuit 4 is a known circuit which functions to receive the picture signal CE and hold its maximum level. A hold signal PH held in the hold circuit 4 is divided to 50% level by two resistors R1 and R2 of the same resistance value and is fed to one of the two input terminals of a comparator 5 as a signal SE of the shading correction target level.

The comparator 5 receives the signal SE and a corrected picture signal RCE outputted from the variable attenuator 3 and compares the levels of these signals. As a result of comparison, the comparator 5 outputs a compared signal COMP whose logical value is "0" when the level of the signal RCE is larger than the level of the signal SE and "1" when the former is smaller than the latter.

A multiplexer 6 receives the output signal COMP of the comparator 5 at its A input, and as the operation starts it always receives a condition setting signal STEM of logical value "1". Then, the multiplexer 6 outputs these signals selectively from an output terminal Y based on the video clock $\phi1$. Particularly, in this device, the signal STEM of B input is selected at every $\frac{1}{2}$ cycle when the clock $\phi1$ becomes logical value "1", and the signal COMP of the A input is selected at every $\frac{1}{2}$ cycle where the clock $\phi1$ becomes logical value "0". The signal thus selected is fed to the D/I terminal of an addressable latch circuit 7 as a signal SEL.

The addressable latch circuit 7 outputs the signal SEL fetched to the D/I terminal from one of eight output terminals Q0 to Q7 designated based on the count output of a line counter 8 provided that an enable signal EN1 is logical value "1". The line counter 8 is an octal counter which sequentially counts based on the line start signal LNST to be applied each time when a single scan over the original is started, and the output terminal Q0 to Q7 are designated one after another from the output terminals Q0 to Q7 each time of a single scan. All signals S11 to S18 having been output from the output terminals Q0 to Q7 respectively become logical value "0" unconditionally except one from the terminals designated by the count output of the counter 8. When the enable signal EN1 is logical value "0", the signals S11 to S18 all become logical value "0" unconditionally.

A tristate buffer 9 is a buffer which takes three states based on an enable signal EN2, and functions, when the enable signal EN2 is logical value "1", to output signals S41 to S48 of logical value "1" or "0" corresponding to the content of each of the output signals S21 to S28 of Exclusive OR circuits EX. OR1 to EX. OR8 and to enter the contents of these signals S41 to S48 to memory areas designated by an address counter 10 of RAM 11 (random access memory), and, when the enable signal EN2 is logical value "0", cut off the signals S41 to S48 regardless of the contents of the signals S21 to S28, i.e., causes the signal to the state neither logical value "1" nor "0".

The address counter 10 is a counter which repeats counting synchronized with the video clock $\phi1$ and designates write and read addresses of RAM 11 sequentially according to the count outputs. Here, $2^{11}=2048$ addressings corresponding to each bit (each picture element per line) of the picture signal CE are performed according to the 11 bit count outputs.

The RAM 11 is a memory for storing shading correction data, and performs the writing of the signal S41 to S48 to memory areas designated by the count outputs of the address counter 10, and the reading of the signals thus written in the memory area. In this device, write and read operations are performed based on the video clock $\phi1$: write operation is performed during the period when the clock $\phi1$ is logical value "0" and read operation is performed during the period when the clock $\phi1$ is logical value "1". During the read operation, the counter 10 acts as the read control means for the memory 11. Read data of the RAM 11 are latched at a latch circuit 12 through OR circuits OR1 to OR8 respectively as signals S51 to S58, and performs drive control of the variable attenuator 3 as described previously. The outputs of the latch circuit 12 are fed to AND circuits AD1 to AD8 and then to the Exclusive OR circuits EX. OR1 to EX. OR8, where Exclusive OR condition is taken between the signals thus fed and the output signals S11 to S18 of an addressable latch circuit 7 and the resultant signals are feedbacked.

Overall operation of this embodiment device will now be described.

This device accomplishes a desired shading correction in the following three steps of operation as the original reader reads a sheet of original:

(1) RAM clear
(2) Shading correction data generation
(3) Shading correction

Figure 4:
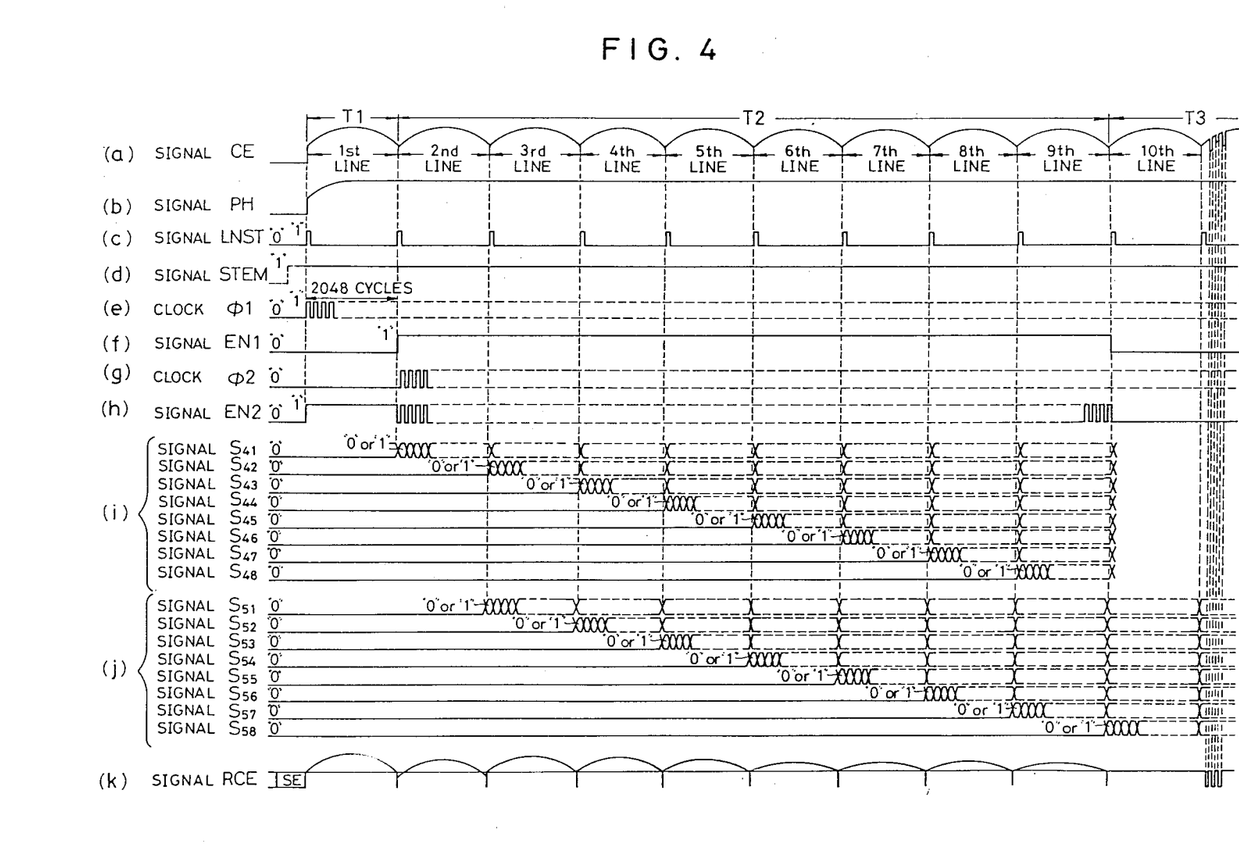
FIGS. 4 through 6 are time charts showing the operation of the shading correction device given in FIG. 3.
Figure 5:
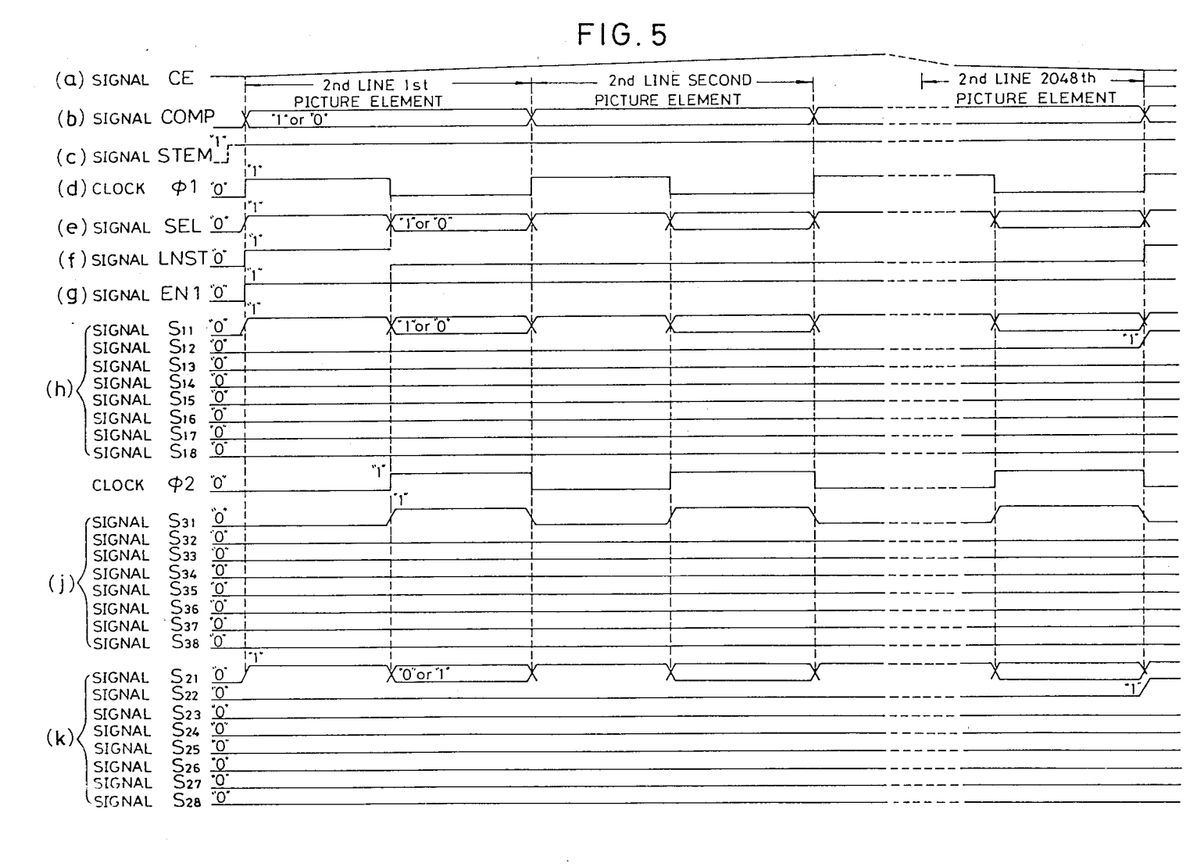
Figure 6:
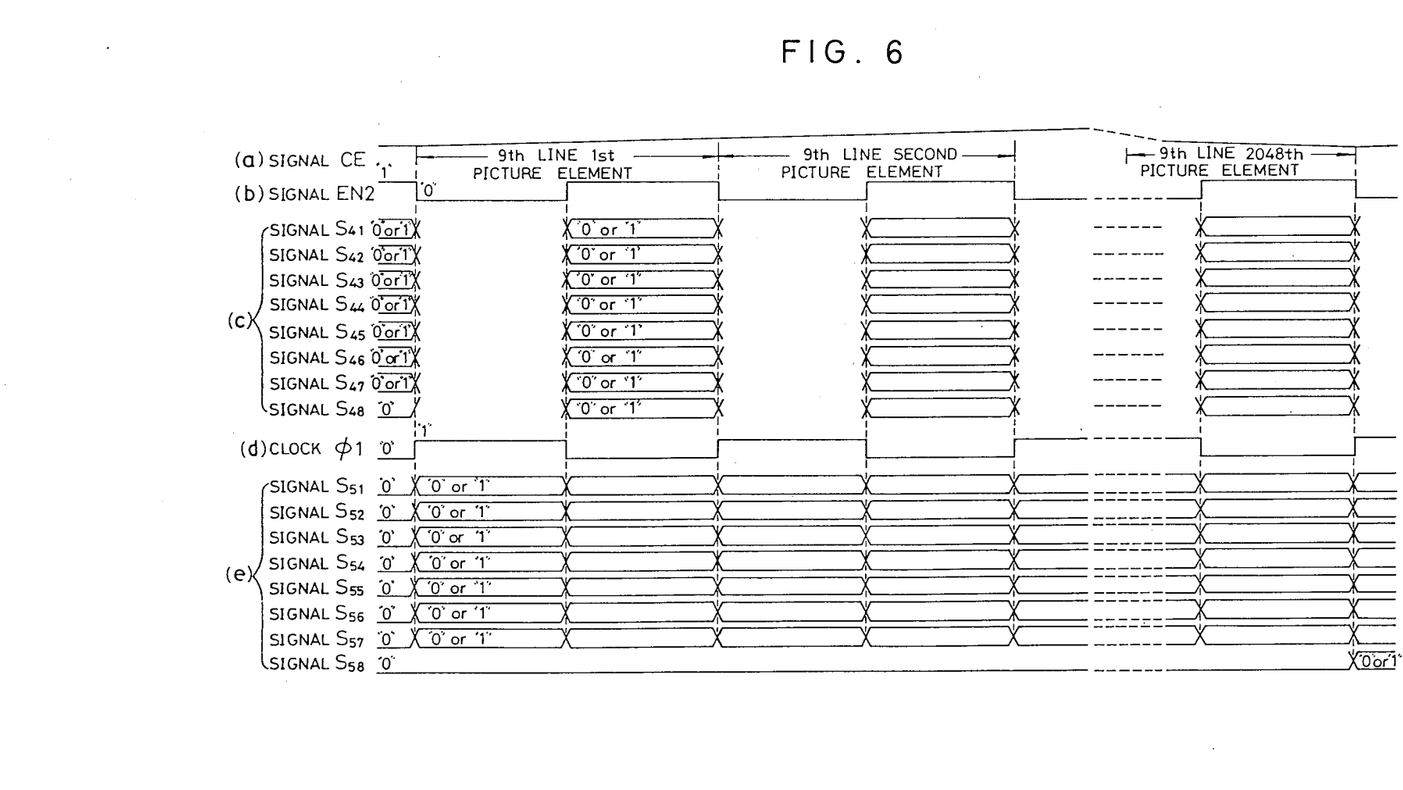
Figure 7:
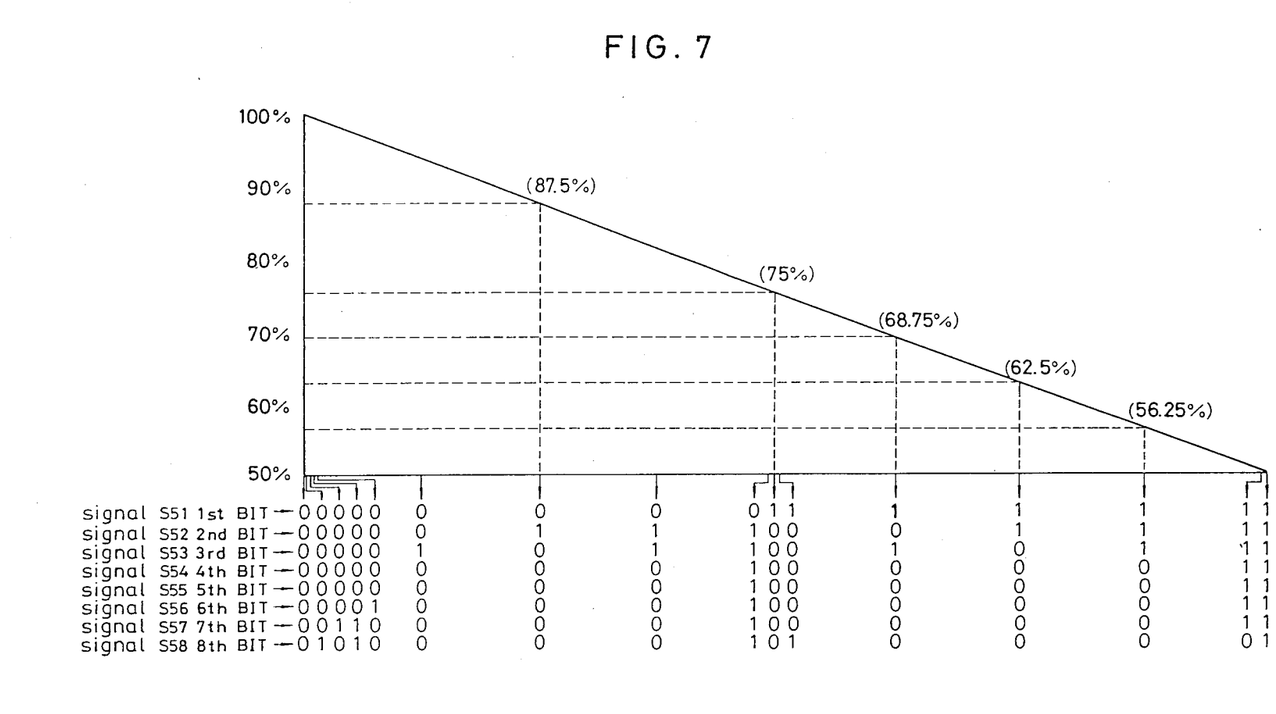
FIG. 7 is a diagram showing the relationship between the shading correction data to be formed by the shading correction device given in FIG. 3 and the extent of level correction of the picture signal to be corrected actually by the device.

Each of the above operations will be described in detail with reference to FIGS. 4 through 7. FIG. 4 is a time chart showing the overall transition of the operations (1) to (3), FIGS. 5 and 6 are time charts showing the state of each signal in the shading correction data generation of (2) above, and FIG. 7 is a diagram showing the relationship between the shading correction data and the degree of the level correction. In the time charts shown in FIGS. 4 through 6, the flyback time in the scanning of the original reader is assumed to be zero for the convenience of description. These time charts show the state of each signal shown in FIG. 3 in which the clock $\phi2$ and enable signals EN1 and EN2 are properly formed by a timing generator not shown in FIG. 3 based on the video clock $\phi1$ or the line start signal LNST and are output.

(1) RAM Clear Operation

This operation is performed utilizing the first scan time, i.e., the first read time T1 of the first line of the original set on the original reader (refer to FIG. 4).

As shown in FIGS. 4 (f), (g) and (h), because the logical values of the enable signal EN1 and the clock $\phi2$ are held to be logical value "0" and the logical value of the enable signal EN2 is held to be "1", the logical values of the output signals S11 to S18 of the addressable latch circuit 8 and those of the output signals S31 to S38 of the AND circuit AD1 to AD8 all become "0". Accordingly, the logical values of the output signals S21 to S28 of the Exclusive OR circuits EX. OR1 to EX. OR8 all become "0", and logical value "0" are entered to all memory areas of RAM 11 before the end of this one scan (refer to FIG. 4(i)). As a result, RAM 11 is cleared.

(2) Shading Correction Data Generation Operation

For the generation of the 8 bit shading correction data, this operation is performed using the second to ninth scan time of the original by the original reader, i.e., the read time T2 (refer to FIG. 4(a)) of all white part of the second line to ninth line.

In this time T2, the enable signal EN1 is held to be logical value "1" (refer to FIG. 4(f)) and the clock $\phi 2$ is fed to one of two inputs of the AND circuit AD1–AD8 and the tristate buffer 9 as inversion signals of the video clock $\phi 1$ (refer to FIGS. 4(g) and (h)). As a result, normally "1" condition setting signal STEM and the comparison output COMP of the comparator 5 are fetched alternately to the addressable latch circuit 8 at every ½ cycle of the clock $\phi 1$, and a specified shading correction data generation operation is performed. This process is shown in FIGS. 5(a) to (n) taking the processing for reading the second line as an example.

For the first picture element of the second line of the original, in the first half cycle where the clock $\phi 1$ is logical value "1" (refer to FIG. 5(d)), since the value "1" signal STEM is latched at the terminal D/I of the addressable latch circuit 7 as a signal SEL (refer to FIGS. 5(c) and (e)), eight signals S11 to S18 are output from the addressable latch circuit 7, in which only the signal S11 is logical value "1" and other signals S11 to S18 are logical value "0" as shown in FIG. 5(h) (the line counter 8 operates providing that the enable signal EN1 is logical value "1", counts 1 at this time, and designates the terminal Q0 of the addressable latch circuit 7). In this half cycle, since the clock $\phi 2$ to be fed to the AND circuits AD1 to AD8 is logical value "0" (refer to FIG. 5(i)), signals S31 to S38 become logical value "0" unconditionally (refer to FIG. 5(j)), the signals S31 to S38 and the signals S11 to S18 are EX. ORed at the Exclusive OR circuits EX. OR1 to EX. OR8, only the signal S21 of the signals S21 to S28 from the EX. ORs becomes logical value "1" as shown in FIG. 5(k), and others become logical value "0". These signals S21 to S26 are latched at the latch circuit 12 through the OR circuits OR1 to OR8 (at this time the output signals S51 to S58 of the RAM 11 are all logical value "0". Refer to FIG. 5(n)), and drive the variable attenuator 3 as a temporary data "10000000". In this embodiment, the data "10000000" is a data directing the variable attenuator 3 to perform 75% attenuation, and the picture signal CE having been fed to the variable attenuator 3 is attenuated to 75% level at this time.

Then, in the latter half cycle of the clock $\phi 1$ in which the logical value of the clock $\phi 1$ becomes "0" for the first picture element of the second line of the original (refer to FIG. 5(d), since the comparison output COMP (refer to FIG. 5(b)) from the comparator 5 where the signal RCE attenuated to 75% level is compared with the signal SE at a level 50% of the peak hold level is latched at the terminal D/I of the addressable latch circuit 8 as a signal SEL (refer to FIG. 5(e)), eight signals S11 to S18 are output from the addressable latch circuit 8, in which only the signal S11 becomes logical value "1" or "0". That determination is made by a judging means, which judges the appropriateness of the temporary data, according to the content of the signal COMP; other signals S12 to S18 become logical value "0" as shown in FIG. 5(h). Incidentally, the logical value of the signal COMP, i.e., the logical value of the signal S11, becomes "0" when the signal RCE is larger than the signal SE and "1" when vice versa. In addition, in this half cycle, because the clock signal $\phi 2$ to be fed to the AND circuit AD1 to AD8 is logical value "1" (refer to FIG. 5(i)), the value "1" signal S21 latched at the latch circuit 12 and the clock $\phi 2$ establish AND condition, eight signals S31 to S38 in which the signals S32 to S38 are logical value "0" are EX. ORed with the signals S11 to S18 at the Exclusive OR circuits EX. OR1 to EX. OR8 respectively, and eight signals S21 to S28 in which only the signal S21 becomes logical value "0" or "1" according to the content of the signal S11 as shown in FIG. 5(k) are loaded to the tristate buffer 9. Of course, since in this half cycle the logical value of the enable signal EN2 is "1" (refer to FIG. 5(l)) and that of clock $\phi 1$ is "0" (refer to FIG. 5(d), signals 41 to 48 (refer to FIG. 5(m)) having the contents similar to the signals S21 to S28 loaded to the tristate buffer 9 are output from this tristate buffer 9, and entered to the memory area corresponding to the first bit (the first picture element) of the picture signal CE designated by the address counter 10 of the RAM 11. That is, when the level of the signal RCE is larger than the signal SE as compared at the comparator 5, the data with the content "10000000" is loaded, while the data with the content "00000000" is loaded when the former is smaller than the latter.

Operation similar to the above is repeated for from the second picture element to the second line 2048th picture element in the second line of the original.

For the third line and subsequent lines, in addition to the above operation the data contents corresponding to the picture elements of the RAM 11 so far been loaded every half cycle of clock $\phi 1$ for each picture element are read as signals 51 to 58 and latched at the latch circuit 12, and the variable attenuator 3 operates so as to attenuate the level of the picture signal CE to be fed each time the line advances to 50% of the peak hold level sequentially (refer to FIG. 4(k)). That is, in this embodiment, the variable attenuator is designed so that the level of picture signal CE is attenuated to 75%, 62.5%, 56.25%, 53.125% . . . each time the logical value becomes "1" from the higher order bit of the data latched at the latch circuit 12 as shown in FIG. 7. For example, in case when data "10000000" is entered to the RAM 11 for a certain picture element at the time of the second line scanning and the variable attenuator 3 is driven by pseudo-data "11000000" in the former half cycle of the picture element at the time of the third line scanning (the level of the picture signal CE is attenuated to 62.5%), the level of this corrected picture signal RCE is still larger than the level of the signal SE, data "11000000" is written to the RAM 11, and the variable attenuator 3 is driven by the temporary data "11100000" in the former half cycle of the picture element at the time of scanning the fourth line. At this time, the picture signal CE is attenuated to 56.25%, the mid-point between 62.5% and 50%. When the level of the corrected picture signal RCE becomes smaller than the level of the signal SE, data "10000000" is written to the RAM 11, and the programmable attenuator 3 is driven by the temporary data "10100000" in the former half cycle of the picture element at the time of fourth line scanning. As a result, the picture signal CE is attenuated to 68.75%, the mid-point between 75% and 62.5%. Subsequently, the relation shown in FIG. 7 is assumed to be maintained in any other case.

In this manner, the shading correction data generation operation is sequentially performed, and when the operation proceeds to the processing for the ninth line scanning, i.e., the last stage, the conditions of the signals S41 to S48, i.e., the condition of the data to be entered to the RAM 11, become the conditions having either one of the two logical contents for each picture element as shown in FIG. 6(c). Of course, the logical content of the data is one driving and controlling the variable attenuator 3 so that the level of each picture element of the picture signal CE to be fed to the variable attenuator 3 is attenuated closest possible to the 50% of peak hold level.

(3) Shading Correction Operation

When the shading correction data generation operation is finished, from the time for the 10th and subsequent scans of the original set on the original reader, i.e., from the read time of the 10th and subsequent lines T3 (refer to FIG. 4(a)), the shading correction operation takes over automatically.

That is, in this time T3, since the enable signals EN1 and EN2 become logical value "0" as shown in FIGS. 4(f) and (h), both addressable latch circuit 8 and tristate buffer 9 become non-active status, and only the read operation of the shading correction data from the RAM 11 and the latch operation at the latch circuit 12 are repeatedly performed (refer to FIG. 4(j)). Accordingly, the variable attenuator 3 performs the aforementioned level correction for each picture element of the picture signal regardless of a type of the picture signal CE being fed subsequently. When the input picture signal CE indicates "all white", its level becomes 50% of peak hold level almost uniformly. When the signal CE indicates "black and white", 50% of peak hold level is taken as the reference of the level of "white" picture element, and the correction picture signal RCE indicating the level attenuated in the same proportion for the picture element is output for the level of "black" picture element (refer to FIGS. 4(a)–4(k)). As a result, the picture signal CE photoelectrically converted at the image sensor 1 is completely shading corrected, and can be transferred to the succeeding equipment as a picture signal of high reliability corresponding to the image information of the original. Thus, the binary conversion is performed with high fidelity based on the comparison with the binary conversion reference level at the binary conversion circuit.

In this embodiment, the above-noted operations (1), (2), and (3) are performed for each original, and for a different, the shading correction data is generated anew based on the peak hold level of the picture signal CE for the white surface of the new original. Since means for detecting the change of the original and initializing this device (including peak hold release) may be made easily by known art, description on such means is omitted.

Although it is preferable to set a reference white level according to the original each time the original is changed as in the case of this embodiment, when the white level change from original to original is small or when the reference white level is to be set at the same level intentionally, the reference white level may be fixed eliminating the peak hold circuit 4 providing that the picture signal is sufficiently amplified by the amplifier 2. In this case, a suitable fixed source should be provided, and the reference level signal SE is to be generated from this power source to be applied to one of the two inputs of the comparator 5. Of course, the reference white level can be set at any desired level other than 50% of the peak hold level according to the manner of voltage division by the resistor R1 and R2, even when the peak hold circuit 4 is used.

Further, in this embodiment the RAM is used as data memory means to make possible the generation of new correction data each time the original changes. However, if what is intended is merely to correct the variation of the characteristics of the original reader itself (variation of the light source luminance distribution, variation of lens transmittivity, variation of image sensor sensitivity, etc.), it is possible to fix the correction data generated using a programmable ROM (read only memory) or other suitable means.

Further still, although the correction data generating means shown in FIG. 3 comprises the multiplexer 6, line counter 7, addressable latch circuit 8, Exclusive OR circuits EX. OR1 to EX. OR8, tristate buffer 9, RAM11, OR circuits OR1 to OR8, latch circuit 12, and AND circuits AD1 to AD8, it is not limited to such construction. It may be comprised of any other logical circuits having the functions equivalent to those of the above-noted circuits. Besides, the number of bits of the shading correction data to be generated by this shading correction device can be chosen optionally since it is determined by the specification of the variable attenuator. Of course, to the variable attenuators of different type level correction manner may be different from the one shown in FIG. 7.

In addition, in this embodiment device the shading correction data generating operation is performed utilizing 8-line all white part of the original set on the original reader. However, if this operation can be completed at n times (n: integer, n=8 in this embodiment) of the cycle speed of the video clock $\phi 1$ (the scan speed may be retarded intentionally), this operation may be completed in the read time of one line all white part of the original set on the original reader. In this case, a clock of 1/n cycle of the video clock $\phi 1$ is used, a clock counter for counting the clock is provided in lieu of the line counter 7, the multiplexer 6, RAM 11, and latch circuit 12 are adapted to be driven and controlled by the generated clock (the address counter 10 alone is driven by the video clock $\phi 1$), and the AND circuits AD1 to AD8 and the tristate buffer 9 are adapted to perform operation based on newly produced clock $\phi 2$ and enable signal EN2 which are generated based on the above generated clock.

What is claimed is:

1. A shading correction device for use with a photoelectric image scanner in which the picture signal level for a reference all white image is different at different locations along a scan line, comprising:
    means for establishing multibit correction data by determining the degree of attenuation of said picture signal level required at each picture element location along said scan line that can make the level of said picture signal for said reference white image be substantially constant along the entire scan line, said determination being made by an iteration process repeated over several successive scans of said all white image with the individual constituent bits of said correction data being acquired on respective successive iteration scans;
    a memory;
    means for writing said established multibit correction data in said memory;
    read control means for sequentially reading the correction data from said memory synchronized with the scanning of an image; and a variable attenuator for performing a level correction of said picture signal at each picture element location based on the correction data read by said read control means.

2. A shading correction device for use with a photoelectric image scanner in which the picture signal level for a reference all white image is different at different locations along a scan line, comprising:
   a random access memory for storing multibit correction data specifying the degree of attenuation of said picture signal level, at each picture element location along said scan line, that can make the level of said picture signal for said reference white image be substantially constant along the entire scan line;
   read control means for sequentially reading the correction data from said memory synchronized with the scanning of an image;
   a variable attenuator connected in a signal line from said scanner for performing a level correction of said picture signal correction of said picture signal at each picture element location based on the correction data read by said read control means;
   means for developing said stored correction data by an iteration process repeated over several successive scans of said all white image with the individual constituent bits of said correction data being acquired on respective successive iteration scans;
   write means, operative on each iteration, for providing correction data for said variable attenuator, said correction data being provided beginning from the higher order bit of said correction data with successive bits of consecutively lesser significance being provided on successive iteration scans;
   means for comparing the attenuator output with a predetermined value;
   means for judging the appropriateness of said temporary data based on the result of said comparison and for correcting said temporary data in accordance with said judgment; and
   means for writing said corrected temporary data into said memory.

3. The shading correction device of claim 2 further comprising means for determining a maximum value of said picture level signal for a reference all white image to be fed to said variable attenuator wherein said predetermined value to be compared with the attenuator output is a value which is 50% of said maximum value.

4. The shading correction device of claim 2 further comprising an amplifier for amplifying the level of said picture signal to be fed to said variable attenuator to a value exceeding said predetermined value.

5. In a photoelectric image sensor system of the type in which the photodetector output signal is selectively attenuated by an attenuator, in accordance with a set of established attennuation factors stored in a storage device, during an image scan so as to compensate for differences in detection performance along a scan line, the improvement comprising;
   means, operative prior to image scanning, for obtaining the peak value of the output signal produced by said photodetector during a scan of a uniform colored reference surface,
   means, operative during one or more successive scans of said uniform colored reference surface, prior to image scanning, for establishing the attenuation factors for said attenuator by comparison of said output signal attenuated by said attenuator with said obtained peak value, and
   means for entering said established attenuation factors in said storage device.

6. A photoelectric image sensor system according to claim 5 wherein each of said attenuation factors is a multibit digital number, and wherein said means for establishing comprises:
   means for setting each attenuation factor to some preselected initial value to be used during the first of said one or more successive scans of said uniform colored reference surface,
   comparison means, operative during each of said one or more successive scans of said uniform colored reference surface for comparing the output of said attentuator with a fixed fraction of said obtained peak value, and
   correcting means, operative during each of said one or more successive scans, for correcting the attenuation factors utilized during that scan in accordance with the result of said comparison.

7. A photoelectric image sensor system according to claim 6 wherein said comparison means and said correcting means are operative during said one or more successive scans of said uniform colored reference surface to correspondingly correct successively lesser significant bits of each of said multibit digital numbers.

8. In a photoelectric image sensor system of the type in which the photodetector output signal is selectively attenuated by an attenuator in accordance with a set of multibit digital attenuation factors so as to compensate for differences in detection performance along a scan line, the improvement wherein;
   there is a linear relationship between each one of said set of multibit digital attenuation factors and the attenuation provided by said attenuator, and wherein said attenuation factors are established by:
   means, operative during a scan of a uniform colored reference surface, for presetting one bit of each one of said set of multibit attenuation factors, said bit being of relatively high significance with respect to the other bits of said multibit attenuation factor, said presetting to establish a present value for each attenuation factor in said set,
   means for comparing during said scan the attenuator output established in accordance with one of said present attenuation factor values and a reference signal level, and
   means for correcting said preset bit of said present attenuation factor value in accordance with the outcome of said comparison.

9. The improvement of claim 8 further comprising means for determining a peak value of a photodetector output signal when obtained without attenuation during a scan of said uniform colored reference surface, wherein said reference signal level is a fixed fraction of said peak value of said photodetector output signal.

10. The improvement of claim 8 wherein said comparing means and said correcting means are operative during a set of successive image scans of said uniform colored reference surface, and wherein on successive ones of said scans the corrected selected bit is of correspondingly lesser significance.

11. A method for correcting shading variations in a scan line of an image scanning apparatus, including:
   producing a set of image signals associated with each picture element of said scan line;

determining a maximum image signal of said set of signals;

clearing a memory;

loading said memory with a set of attenuation factors, said attenuation factors being established by binary information obtained by comparing the output of a variable attenuator which receives each image signal of said set of image signals to 50% of said maximum image signal; and thereafter using said memory to generate digital control words to vary said attenuation factors for each picture element of said scan line.

12. An apparatus to get a uniform effective output picture signal level for each fixed position across a scan line of "white" regardless of differences in (a) light level, (b) lens attenuation and (c) sensor sensitivity across a scan line, comprising:

a variable attenuator connected in a signal line from said scanner for performing a level correction of each picture element of a line based on a set of attenuation factors stored in addresses of a storage device, each of said attenuation factors being established by a multibit binary number associated with each picture element;

means for determining a peak output picture signal level of said scan line of "white";

means for generating said attenuation factors by comparing an output of the variable attenuator to said peak "white" output signal level by a comparator apparatus, said generating means operative during one or more successive scans of said line of "white" wherein consecutively lower significant bits of each of said multibit numbers is assigned a binary 0 when said attenuator output is greater than 50% of said peak output and a binary 1 when said attenuator output is less than 50% of said peak output; and means for writing said multibit binary numbers associated with said attenuation factors in said addresses of said storage device.

13. The apparatus cited in claim 12 wherein the means to generate each of said attenuation factors is arrived at by a process of successive iterative approximations.

14. The apparatus cited in claim 13 wherein each of said successive interative approximations for generating each of said attenuation factors is approximated in increasingly finer steps.

15. The apparatus cited in claim 12 wherein said addresses of said storage device are filled in eight consecutive passes with each of said addresses being updated bit-by-bit for every picture element of a picture line.

16. The apparatus cited in claim 12 wherein each of said attenuation factors is linearly dependent on said multibit binary numbers, said attenuation factors varying from 100% for all 0's to 50% for all 1's.

17. A method to get a uniform effective output picture signal level for each picture element across a scanned line of "white" regardless of differences in (a) light level, (b) lens attenuation, and (c) sensor sensitivity across a scan line, comprising:

determining the peak unattenuated output picture signal level of said scan line of "white";

generating a set of attenuation factors, each of said attenuation factors being established by a multibit binary number associated with each picture element, by comparing an output signal level through a variable attenuator to said peak "white" output signal level, said comparison occurring during each of eight consecutive scans of said white line, wherein consecutively lower significant bits of each of said multibit binary numbers is assigned a binary 0 when said attenuator output is greater than 50% of said peak output and a binary 1 when said attenuator output is less than 50% of said peak output;

storing in a memory said generated attenuation factors; and performing a level correction of each picture element of a line based on said set of attenuation factors.

* * * * *